United States Patent [19]

Nakaya et al.

[11] 4,405,592
[45] Sep. 20, 1983

[54] PROCESS FOR PRODUCING ANHYDROUS SODIUM CARBONATE CRYSTAL

[75] Inventors: Keiichi Nakaya, Chiba; Kohji Kawanami; Suekazu Hirata, both of Ichihara, all of Japan

[73] Assignee: Asahi Glass Company Ltd., Tokyo, Japan

[21] Appl. No.: 226,166

[22] Filed: Jan. 19, 1981

[30] Foreign Application Priority Data

Feb. 1, 1980 [JP] Japan .................................. 55-10025

[51] Int. Cl.³ ...................... C01D 15/08; C01D 7/00; C01D 7/24
[52] U.S. Cl. .................................... 423/421; 123/426; 23/302 T
[58] Field of Search .............. 423/421, 426, 427, 190, 423/206 T; 23/302 T

[56] References Cited

U.S. PATENT DOCUMENTS

| | | | |
|---|---|---|---|
| 2,133,455 | 10/1938 | Keene et al. | 423/426 |
| 3,212,848 | 10/1965 | Tasiaux | 423/421 |
| 3,656,892 | 4/1972 | Bourne et al. | 423/421 |
| 3,842,157 | 10/1974 | Neumann | 423/421 |
| 3,843,768 | 10/1974 | Neumann | 423/421 |
| 3,933,977 | 1/1976 | Ilardi et al. | 423/206 T |

FOREIGN PATENT DOCUMENTS

| | | | |
|---|---|---|---|
| 660545 | 4/1963 | Canada | 423/426 |
| 760890 | 6/1967 | Canada | 423/426 |
| 46-16664 | 5/1971 | Japan | 423/426 |
| 443101 | 2/1936 | United Kingdom | 423/426 |
| 2024187 | 1/1980 | United Kingdom | 423/421 |

*Primary Examiner*—Gary P. Straub
*Attorney, Agent, or Firm*—Oblon, Fisher, Spivak, McClelland & Maier

[57] ABSTRACT

An anhydrous sodium carbonate crystal is produced by crystallizing an anhydrous sodium carbonate crystal from an aqueous solution of sodium carbonate in the presence of 0.5 to 10 wt. % of sodium chloride and 0.3 to 20 wt. % of sodium hydroxide and separating the crystal from a mother liquor.

7 Claims, 3 Drawing Figures

PROCESS FOR PRODUCING ANHYDROUS SODIUM CARBONATE CRYSTAL

BACKGROUND OF THE INVENTION

1. Field of the Invention

The present invention relates to a process for producing a dense anhydrous sodium carbonate crystal by an aqueous solution reaction.

2. Description of the Prior Arts

The practical process employed as an industrial process for producing a dense anhydrous sodium carbonate crystal is characterized by calcining sodium bicarbonate to form porous anhydrous sodium carbonate; hydrating it into sodium carbonate hydrate; and treating it by a steam tubed dryer (STD). This process is complicated and requires a large energy consumption. In this process, a dense anhydrous sodium carbonate crystal is produced, but is not completely dense because the spaces are remained by evaporating water in the dehydration in the steam tubed dryer. The bulk density of the product has been in a range of about 1.0 to 1.1.

On the other hand, a process for producing the dense anhydrous sodium carbonate in an aqueous solution reaction has been reported.

On the process disclosed in U.S. Pat. No. 2,133,455, wherein sodium hydroxide or sodium chloride are added to an aqueous solution obtained by decomposing sodium bicarbonate to decrease the transition temperature between sodium carbonate monohydrate and anhydrous sodium carbonate to be lower than a boiling point of the solution, and the solution is concentrated in an evaporator to crystallize an anhydrous sodium carbonate crystal. The anhydrous sodium carbonate crystal is crystallized by this process. In this process, the solution is concentrated by evaporating water by an evaporation whereby the energy consumption is remarkably large. In order to reduce the transition temperature to a desired temperature, it is necessary to incorporate 10 wt. % of sodium chloride or more. The incorporated sodium chloride is disadvantageously included as the impurity in high level in the anhydrous sodium carbonate crystal. When the amount of sodium hydroxide is too much, the growth of the crystal is inhibited or the viscosity of the solution is increased to cause diadvantageously troubles in the operation.

The other known process is the process disclosed in Japanese Unexamined Patent Publication No. 7530/1980, wherein anhydrous sodium carbonate is produced by the transition of sodium carbonate hydrate in an aqueous solution of sodium carbonate containing 10 to 22 wt. % of sodium chloride at a temperature of 3° to 7° C. higher than the transition temperature for the transition. In this process, the content of sodium chloride is large to contaminate the product with a relatively large amount of sodium chloride as the impurity.

SUMMARY OF THE INVENTION

It is an object of the present invention to provide a process for producing a dense anhydrous sodium carbonate crystal by an aqueous solution reaction with a small energy consumption.

The foregoing and other objects of the present invention have been attained by producing an anhydrous sodium carbonate crystal by crystallizing an anhydrous sodium carbonate crystal from an aqueous solution of sodium carbonate in the presence of 0.5 to 10 wt. % of sodium chloride and 0.3 to 20 wt. % of sodium hydroxide and separating the crystal from a mother liquor.

DETAILED DESCRIPTION OF THE PREFERRED EMBODIMENTS

When sodium carbonate crystal is crystallized from an aqueous solution of sodium carbonate, the transition temperature between the anhydrous sodium carbonate and the sodium carbonate monohydrate is about 112° C. Therefore, only sodium carbonate monohydrate crystal is obtained except increasing a boiling point of the aqueous solution of sodium carbonate to be higher than 109° C., under higher pressure. This fact is well known. It has been proposed to reduce the transition temperature by incorporating sodium chloride in the aqueous solution of sodium carbonate. The effect has not been satisfactory. In order to reduce the transition temperature below the boiling point of the aqueous solution of sodium carbonate, the amount of sodium chloride should be increased. It should be higher than 10 wt. % preferably higher than 15 wt. % to attain the purpose. Thus, a large amount of sodium chloride as the impurity is included in the anhydrous sodium carbonate crystal from the mother liquor adhered on the crystal. In order to prevent the trouble, the anhydrous sodium carbonate crystal should be washed. During the washing, the surface of the anhydrous sodium carbonate crystal is disadvantageously changed into sodium carbonate monohydrate.

It is not impossible to attain the purpose by using the boiling point under high pressure with a small amount of sodium chloride. However, the operation under the atmospheric pressure is desired.

The inventors have studied to overcome the problem and have found that the amount of sodium chloride can be remarkably reduced by combining sodium hydroxide with sodium chloride. That is, the amount of sodium chloride can be remarkably reduced by incorporation of a small amount of sodium hydroxide. The same effect in the case of only sodium chloride is attained by using a smaller amount of the total of sodium chloride and sodium hydroxide. Moreover, as surprising effect of the combination of sodium chloride and sodium hydroxide, the crystal habit modification effect for forming an anhydrous sodium carbonate crystal having relatively spherical shape and large size has been found.

This will be further illustrated in detail in the following example.

Figure 1:
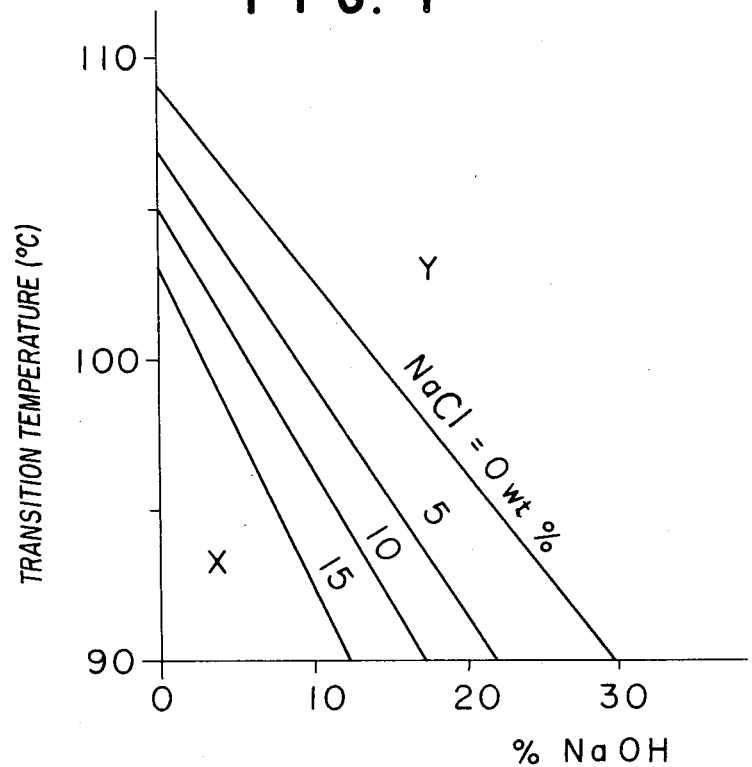
FIG. 1 is a graph showing transition temperatures between sodium carbonate monohydrate and anhydrous sodium carbonate in the presence of sodium chloride and sodium hydroxide wherein the left lower X region shows the stable region of sodium carbonate monohydrate and the right upper Y region shows the stable region of anhydrous sodium carbonate.

Referring to FIG. 1 prepared by the inventors, this will be further illustrated.

FIG. 1 is a graph showing transition curve between sodium carbonate monohydrate and anhydrous sodium carbonate. The left lower region X to the transition curve shows the sodium carbonate monohydrate region and the right upper region Y to the transition curve shows the anhydrous sodium carbonate region.

Referring to FIG. 1, the effect for reducing the transition temperature to the concentration of sodium hydroxide and the concentration of sodium chloride is studied. The results are shown in Table.

TABLE

| NaCl (wt. %) | ΔT/NaOH (°C./% NaOH) | NaOH (wt. %) | ΔT/NaCl (°C./% NaCl) |
|---|---|---|---|
| 15 | 1.083 | 20 | 0.82 |
| 10 | 0.872 | 15 | 0.74 |
| 5 | 0.737 | 10 | 0.69 |
| 0 | 0.642 | 5 | 0.54 |
|  |  | 0 | 0.40 |

In Table, left column, ΔT/NaOH means a degree for reducing the transition temperature ΔT with 1% NaOH. When sodium chloride is not present, the transition temperature is reduced for only 0.642° C. per 1% NaOH. When 10 wt. % NaCl is present, the transition temperature is reduced for 0.872° C. per 1% NaOH. (The transition temperature lowering coefficient is increased for 36%.)

On the other hand, in Table, right column, ΔT/NaCl means a degree for reducing the transition temperature ΔT with 1% NaOH. When sodium hydroxide is not present, the transition temperature is reduced for only 0.40° C. per 1% NaCl. When 20 wt. % NaOH is present, the transition temperature is reduced for 0.82° C. per 1 % NaCl. (The transition temperature lowering coefficient is increased for 105%.).

The fact of remarkable synergistic effect of sodium chloride and sodium hydroxide to the transition temperature lowering coefficient is found in the present invention.

In view of the above-mentioned facts and the purity of the product, the content of sodium chloride is preferably in a range of 0.2 to 10 wt. %, especially 0.5 to 9 wt. %.

On the other hand, in order to impart the effect of the present invention, it is necessary to incorporate sodium hydroxide at a ratio of 0.3 to 23 wt. %, especially 1.5 to 15 wt. %.

The reason of the range of sodium chloride is as follows. When it is less than 0.5 wt. %, the effect of sodium chloride is quite small. When it is more than 10 wt. %, further increase of the effect of sodium chloride is not found and the amount of sodium chloride included in the product of the anhydrous sodium carbonate crystal is increased.

The reason of the range of sodium hydroxide is as follows.

When it is less than 0.3 wt. %, the effect of sodium hydroxide is not found. When it is more than 20 wt. %, the growth of the anhydrous sodium carbonate crystal is inhibited and the viscosity of the solution is increased to cause a trouble in the operation.

In accordance with the incorporation, the crystallization can be carried out under near the atmospheric pressure such as 0.7 to 1.3 atm.

In usual, an amount of the impurity in the sodium carbonate product should be low, for example, a content of sodium chloride should be less than 0.5 wt. % in Japanese Industrial Standard. In accordance with the process of the present invention, the anhydrous sodium carbonate crystal obtained by crystallization and separation is in the range of Japanese Industrial Standard without the water washing which requires a complicated operation and causes formation of sodium carbonate monohydrate.

Certain embodiments of the process of the present invention will be illustrated.

Figure 2:
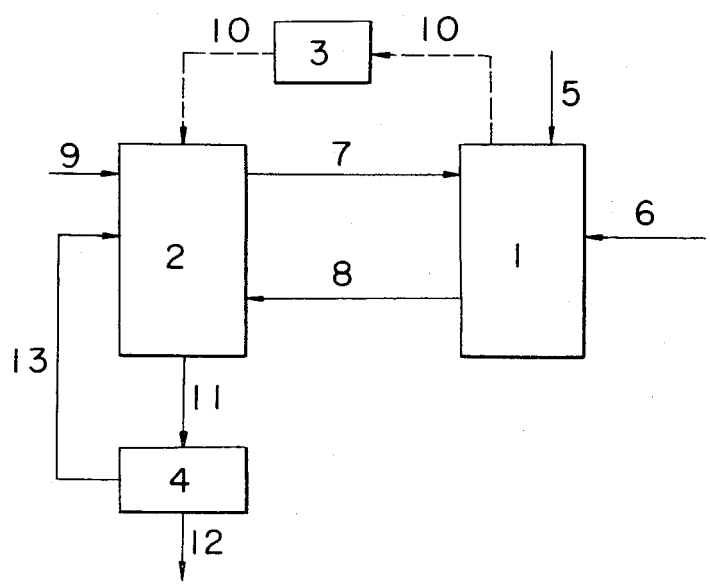
FIG. 2 is a block diagram of one embodiment of the process of the present invention.

FIG. 2 is a block diagram of one embodiment of the process of the present invention.

In FIG. 2, the starting material (4) is fed into an anhydrous sodium carbonate crystallizing vessel (1) in which an aqueous solution of sodium carbonate is fed. The starting material (4) can be sodium hydroxide and sodium bicarbonate or a sodium bicarbonate-containing compound such as sodium sesquicarbonate or an aqueous solution of sodium carbonate obtained from the components, or it can be also a combination of sodium hydroxide and carbon dioxide or an aqueous solution of sodium carbonate obtained from the components or it can be also a sodium carbonate hydrate crystal or an aqueous solution of sodium carbonate obtained from the components.

In the vessel (1), sodium chloride and sodium hydroxide (5) are fed. The condition of the vessel (1) is maintained in the stable region of the anhydrous sodium carbonate and the anhydrous sodium carbonate crystal is formed to be suspended in the vessel (1). The slurry (6) containing the crystal is discharged from the bottom of the vessel (1) and is separated into the solid liquid separation by a crystal separator (2). The condition in the crystal separator (2) is to maintain in the stable region of anhydrous sodium carbonate. The anhydrous sodium carbonate separated by the crystal separator can be dried depending upon the purity of the desired product or can be washed with an aqueous solution of sodium hydroxide and dried in carbon dioxide gas. It is necessary to maintain the stable region of anhydrous sodium carbonate in the drying step or the combination of the washing step and the drying step.

When the resulting anhydrous sodium carbonate crystal is dissolved in water to prepare an aqueous solution of sodium carbonate, sometimes, turbidity of the solution is caused. In order to prevent such turbidity, the anhydrous sodium carbonate crystal should be heat-treated at higher than 160° C., especially higher than 180° C. In particular, it is heat-treated at 180° C. for longer than 20 minutes or at 200° C. for longer than 5 minutes. The effect of the heat-treatment may be attained by drying the crystal at higher than 160° C. in the drying step.

When the crystal is washed with the aqueous solution of sodium hydroxide, sodium hydroxide adhered on the surface of the crystal can be easily converted into anhydrous sodium carbonate by a carbonation under a desired condition. Sodium hydroxide can be in an anhydrous region under the atmospheric pressure. Even though the aqueous solution of sodium hydroxide is used as the washing water, a contamination of an impurity is not considered.

Thus, the sodium carbonate obtained by the carbonation is hard crystal combined into one-piece with the anhydrous sodium carbonate crystal and is not peeled off or pulverized. There is no adverse effect to the purity of the product by the use of sodium hydroxide.

The mother liquor (8) separated from the crystal in the crystal separator (2) is recycled into the anhydrous sodium carbonate crytallizing vessel.

The separator is not critical and is preferably a continuous centrifugal separator because it is possible to prevent a trouble that a part of the separated cake is converted into sodium carbonate monohydrate by decrease of the temperature to aggregate the cake. In the separation and drying steps, it is preferable to increase a dehydration coefficient and to rapidly discharge the crystal from the separator for example to dry the crystal by feeding it directly into a flowing dryer in a dispersed form or to mix the crystal with a large amount of dried product and to feed rapidly the mixture in a dryer.

When sodium hydroxide is adhered in the drying step, sodium hydroxide is converted into sodium carbonate and sodium carbonate is firmly adhered on the surface of the crystal, by drying it in an atmosphere containing carbon dioxide gas. The purity of the product is not decreased to obtain high quality product.

When a content of fine crystals is preferably reduced, the fine crystals formed in the vessel (1) or fine crystals formed in the drying step are fed into the evaporator which is maintained in the stable region of sodium carbonate monohydrate, to convert them into the sodium carbonate monohydrate crystal and the crystal is fed into the vessel (1) as the starting material. On the other hand, the solution in the upper part of the anhydrous sodium carbonate crystallizing vessel (1) is discharged as the mother liquor (9) to feed it into the evaporator (3). The solution is concentrated by the evaporator to crystallize the sodium carbonate hydrate crystal or the anhydrous sodium carbonate crystal. It is preferable to crystallize the sodium carbonate hydrate crystal for producing a high quality anhydrous sodium carbonate crystal.

A part or whole of the mother liquor is discharged as the purged solution (11) in order to increase the purity of the product. The residual sodium carbonate crystal is recycled as the solid or the slurry (10) into the vessel (1). Steam (12) generated by the evaporator (3) is discharged to be utilized.

In the process of the present invention, the evaporator is used for removing water with a small energy consumption and also increasing a concentration of impurities so as to reduce the amount of sodium carbonate used for removing the impurities. Therefore, it is preferable to use a multi-effect evaporator in which the sodium carbonate monohydrate crystal is usually crystallized. It is preferable to concentrate the solution to give the saturated concentration of the impurities or near saturation. A part or whole of the mother liquor discharged from the evaporator is preferably purged so as to reduce the concentration of the impurity in the product to be lower than the allowable level. The ratio of the impurities in the product is decided depending upon the concentration of the impurities in the vessel (1).

The process having the evaporator need not be employed if the content of the impurities in the starting material is small. The mother liquor can be kept in the vessel (1).

Figure 3:
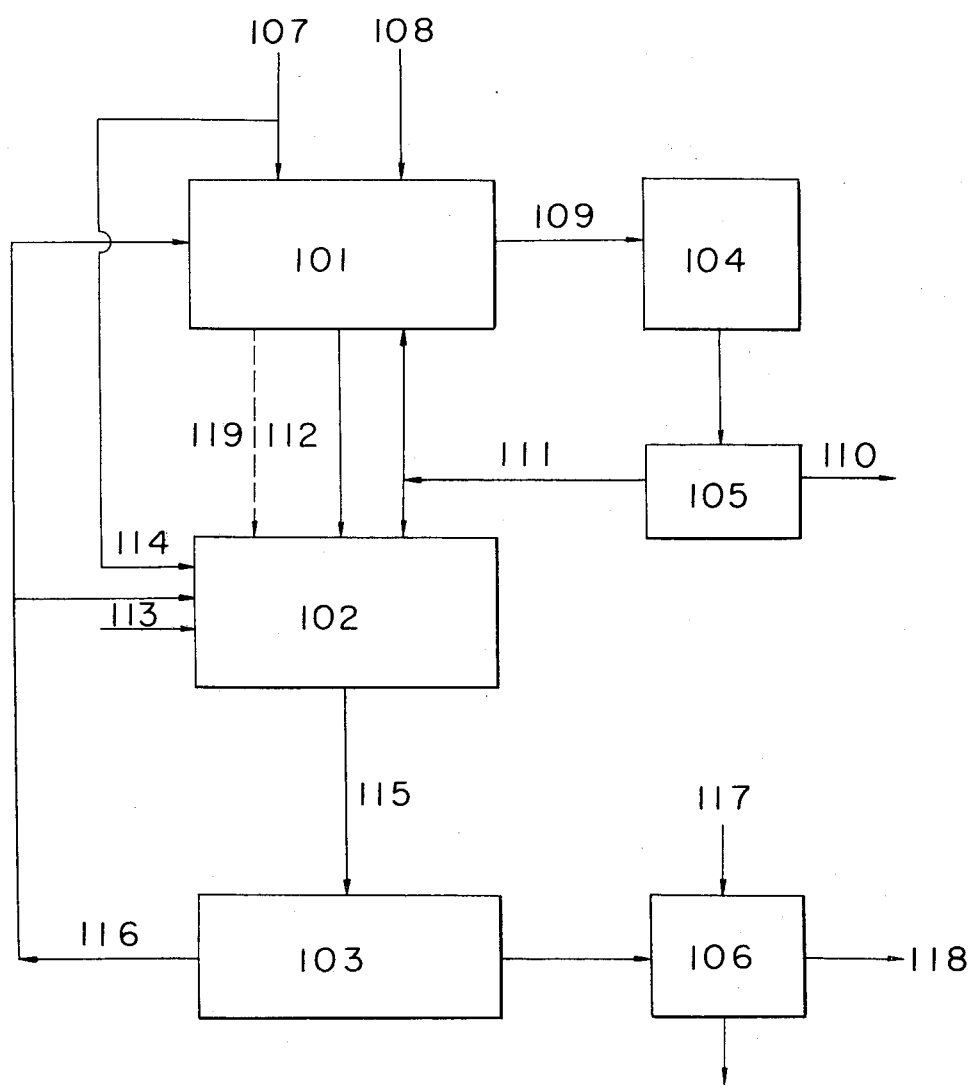
FIG. 3 is a block diagram of the other embodiment of the process of the present invention.

The other embodiment of the present invention shown in FIG. 3 will be illustrated.

FIG. 3 is similar to the flow sheet of FIG. 2 except that only slurry layer is formed in the anhydrous sodium carbonate crystallizing vessel (1) without forming both of the slurry layer and the supernatant layer. The slurry (16) is discharged and separated in the solid-liquid separation by the separator (2). A part of the separated mother liquor (18) is directly fed into the evaporator (3). The residual mother liquor is recycled into the vessel (1). The other feature is the same as that of FIG. 2.

In accordance with the process of the present invention, the energy cost is remarkably lower than that of the conventional process for heating the sodium carbonate monohydrate crystal. According to the studies, the required heat can be $\frac{1}{3}$ to 1/7 time of the required heat in the conventional process. The energy saving process is one of the advantage of the present invention.

The present invention will be further illustrated by certain examples and references which are provided for purposes of illustration only.

EXAMPLE

A sodium bicarbonate crystal, a sodium sesquicarbonate crystal and a sodium carbonate monohydrate crystal obtained by the ammonium chloride-soda process and an aqueous solution of sodium hydroxide obtained by a mercury process or an electrolytic process and a sodium chloride crystal obtained by purifying a rock salt were used as the starting materials. The starting materials were sequentially added to water at ratios shown in Table 2 and the mixture was maintained under the condition shown in Table 2 to give the composition of the mother liquor shown in Table 2 to crystallize an anhydrous sodium carbonate crystal.

The temperature in the crystallization was about 2° C. higher than the transition temperature of the composition. The composition of the starting materials are shown in Table 1.

Example 13 is the reference using the sodium carbonate by the conventional process (the product was not sieved).

The crystal was separated by a filtration, from the mother liquor and was fired. (Example 10 was modified as described below). The characteristics of the particle size distribution, the bulk density, the angle of repose, the chemical formulation, the grinding test result, and the spherical degree of crystal of the resulting anhydrous sodium carbonate crystal were measured and shown in Table 2.

TABLE 1

|  | $NaHCO_3$ | $Na_2CO_3$ | NaCl | NaOH | $H_2O$ | Other |
|---|---|---|---|---|---|---|
| Sodium bicarbonate crystal | 76.3 | 1.0 | 0.15 | 0 | 14.9 | $NH_4$—$HCO_3$ 8 |
| Sodium sesqui-carbonate crystal | 35.3 | 44.6 | 0 | 0 | 20.0 |  |
| Sodium carbonate monohydrate crystal | 0 | 81.0 | 0.10 | 0 | 18.8 |  |
| Aq. sol. of sodium hydroxide | 0 | 0.15 | 0 | 49 | 50 |  |
| Sodium chloride crystal | 0 | 0 | 97.4 | 0 | 1.5 |  |

TABLE 2

| | Example | | | | | | | | | | | | |
|---|---|---|---|---|---|---|---|---|---|---|---|---|---|
| | 1 *1 | 2 *1 | 3 *1 | 4 | 6 | 7 | 11 | 12 *1 | 13 *1 | 5 | 8 | 9 | 10 |
| Composition charged (wt. %) | | | | | | | | | | | *5 | | *6 |
| Sodium bicarbonate crystal | — | — | — | 41.7 | 39.9 | — | — | — | — | — | — | — | — |
| Sodium sesquicarbonate crystal | 60.3 | 60.3 | — | — | — | — | — | — | — | 50.3 | 74.3 | 46.3 | 74.3 |
| Sodium carbonate monohydrate crystal | — | — | 60.1 | — | — | 66.0 | 43.1 | 57.2 | — | — | — | — | — |
| Aq. sol. of sodium hydroxide | 20.7 | 20.7 | — | 49.2 | 43.6 | 8.2 | 31.3 | — | — | 31.8 | 25.6 | 35.7 | 25.5 |
| Sodium chloride crystal | — | 0.5 | 5.3 | — | 5.3 | 3.3 | 4.6 | 9.9 | — | 0.5 | 0.2 | 2.0 | 0.2 |
| Water *7 | 19.0 | 18.5 | 34.6 | 9.1 | 11.2 | 22.5 | 21.0 | 32.9 | — | 17.4 | (−32.1) | 15.9 | (−32.0) |
| Aqueous solution (wt. %) | | | | | | | | | | | | | |
| $NaCO_3$ | 29.2 | 29.0 | 21.4 | 15.5 | 12.6 | 19.2 | 1.4 | 14.7 | — | 15.4 | 20.7 | 10.0 | 19.5 |
| NaOH | 0 | 0 | 0 | 11 | 8 | 6 | 23 | 0 | — | 11 | 1.5 | 15 | 0.8 |
| NaCl | 0 | 0.8 | 8 | 0.2 | 8 | 5 | 7 | 15 | — | 0.8 | 8 | 3 | 9 |
| Condition of crystallization | | | | | | | | | | | | | |
| Temperature (°C.) | 115 | 114.5 | 109 | 104 | 102 | 105 | 92 | 104 | | 104 | 106 | 102 | 106 |
| Pressure (atm.) | 1.35 | 1.31 | 1.14 | 1 | 1 | 1 | 1 | 1 | | 1 | 1 | 1 | 1 |
| Time (hr.) | 1 | 1 | 1 | 1 | 1 | 1 | 1 | 1 | | 1 | 1 | 1 | 1 |
| Crystallization process | salt out | salt out | salt out | salt out | salt out | evap. | salt out | salt out | — | salt out | salt out | salt out | salt out |
| Characteristic of anhydrous sodium carbonate crystal | | | | | | | | | | | | | |
| Average particle diameter (μ) | 58 | 270 | 500 | 120 | 680 | 600 | 300 | 360 | 600 | 580 | 590 | 630 | 600 |
| size distribution | | | | | | | | | | | | | |
| 2000μ< | 0 | 0 | 0 | 0 | 0 | 0 | 0 | 0 | 5 | 0 | 0 | 0 | 0 |
| 1000μ–2000μ | 0 | 0 | 6 | 0 | 11.5 | 12 | 0.3 | 1 | 15 | .7 | 9 | 11 | 10 |
| 500μ–1000μ | 0 | 7 | 31 | 0 | 43.5 | 36 | 12.7 | 18 | 23 | 35 | 35 | 40 | 36 |
| 300μ–500μ | 0 | 23 | 26 | 0 | 22 | 24 | 26 | 28 | 15 | 24 | 26 | 22 | 25 |
| 150μ–300μ | 1 | 34 | 24 | 17 | 14 | 18 | 33 | 31 | 16 | 24 | 20 | 17 | 19 |
| 50μ–150μ | 44 | 28 | 10 | 66 | 7.5 | 8 | 22.8 | 17.8 | 16 | 7 | 7 | 8 | 8 |
| 50μ> | 55 | 8 | 3 | 17 | 1.5 | 2 | 5.2 | 4.2 | 10 | 3 | 3 | 2 | 2 |
| Bulk density (g/cc) *2 | 1.48 | 1.52 | 1.62 | 1.49 | 1.60 | 1.62 | 1.60 | 1.59 | 1.01 | 1.61 | 1.60 | 1.61 | 1.60 |
| Angle of repose (degree) | 41 | 39 | 37 | 40 | 35 | 36 | 38 | 38 | 43 | 36 | 35 | 36 | 35 |
| Chemical formulation | | | | | | | | | | | | | |
| $NaCO_3$ | 99.9 | 99.8 | 99.5 | 99.8 | 99.5 | 99.7 | 99.5 | 99.1 | 99.5 | 99.6 | 99.8 | 99.7 | 99.9 |
| NaOH | 0 | 0 | 0 | 0 | 0 | 0 | 0 | 0 | 0 | 0 | 0 | 0 | 0 |
| NaCl | 0 | 0.04 | 0.38 | 0.01 | 0.38 | 0.23 | 0.38 | 0.78 | 0.35 | 0.28 | 0.1 | 0.31 | 0.01 |
| $H_2O$ | 0.1 | 0.1 | 0.1 | 0.1 | 0.1 | 0.1 | 0.1 | 0.1 | 0.1 | 0.1 | 0.1 | 0.1 | 0.1 |
| Grinding test *3 | 0.5 | 0.4 | 0.1 | 0.4 | 0.1 | 0.1 | 0.3 | 0.2 | 1.2 | 0.1 | 0.1 | 0.1 | 0.1 |
| Spherical degree of crystal *4 | 1.41 | 1.40 | 1.40 | 1.25 | 1.05 | 1.08 | 1.28 | 1.33 | 2.78 | 1.10 | 1.11 | 1.04 | 1.12 |

*1 Reference
*2 200 Grams of a sample powder is charged in a 200 ml. mescylinder which is vibrated by a vibrator. A volume in constant is measured and calculated.
*3 A dried sample powder is sieved through a 80 mesh sieve and 50 g. of the remained powder is charged with 15 pieces of agate balls (weight 35 g.) in a 250 ml. container and is ground at 170 rpm for 30 minutes. The ground sample is sieved through a 200 mesh sieve and the weight of the powder sieved through the 200 mesh sieve is weighed and the weight ratio is shown.
*4 Ten crystals are selected and the maximum diameter and the minimum diameter of each crystal are measured by a microscope. Each ratio of the diameter is calculated and the average ratio of them is shown.
*5 The tripple effect evaporator shown in FIG. 2 was used and an aqueous solution in the anhydrous sodium carbonate crystallizing vessel (1) was fed into the evaporator (3) to evaporate the aqueous solution at 100, 83 and 65° C. under the pressure of 0.9, 0.38 and 0.9 atm. The slurry of the sodium carbonate monohydrate crystal was separated from the mother liquor and purged. The sodium carbonate monohydrate crystal was recycled into the vessel (1).
*6 The tripple effect evaporator shown in FIG. 3 was used. A whole of a slurry of an anhydrous sodium carbonate crystal crystallized in the anhydrous sodium carbonate crystallizing vessel (1) was fed into the crystal separator (2) to separate the crystal from the mother liquor. A half of the mother liquor was recycled into the vessel (1). The remainder was fed into the evaporator (3). The operation was the same as the operation in the process *5. The crystal obtained in the crystal separator (2) was washed with an aqueous solution of sodium hydroxide at 90° C. to remove sodium chloride from the surface of the crystal and was dried at 180° C. in carbon dioxide gas.
*7 ( ) Ratio of distilled water in the evaporator.

We claim:

1. A process for producing an anhydrous sodium carbonate crystal which comprises (a) crystallizing substantially at atmospheric pressure an anhydrous sodium carbonate crystal from an aqueous solution of sodium carbonate by adding in said aqueous solution both sodium chloride and sodium hydroxide whereby crystals of anhydrous sodium carbonate of spherical degree ranging from 1.28 to about 1.04 are produced; and (b) separating said crystals of anhydrous sodium carbonate from a mother liquor.

2. The process according to claim 1 wherein said aqueous solution of sodium carbonate is obtained by reacting sodium hydroxide and sodium bicarbonate or a sodium bicarbonate-containing compound or by reacting carbon dioxide and sodium hydroxide or by dissolving sodium carbonate hydrate.

3. The process according to claim 1 or claim 2 wherein said aqueous solution of sodium carbonate is prepared at substantially atmospheric pressure.

4. The process according to claim 1 wherein said anhydrous sodium carbonate crystal is washed with an aqueous solution of sodium hydroxide and the washed product is treated in an atmosphere containing carbon dioxide gas.

5. The process according to claim 1 wherein said mother liquor is concentrated without crystallizing impurities from said mother liquor and the anhydrous sodium carbonate crystal and/or sodium carbonate monohydrate crystallized in the concentration are separated from said mother liquor and a part or whole of the concentrated mother liquor is purged.

6. The process of claim 1 wherein after said addition sodium chloride concentration ranges from 0.2 to 10 wt. % and sodium hydroxide concentration ranges from 0.3 to 23 wt. %.

7. The process of claim 6 wherein said amount of sodium hydroxide in said aqueous solution ranges from 1.5 to 15 wt. % of said aqueous solution.

* * * * *